United States Patent [19]
Wygasch

[11] 3,736,724
[45] June 5, 1973

[54] METHOD OF DRYING AND DEMERCURIZING HYDROGEN

[76] Inventor: Ewald Wygasch, 10 Eberstrasse, 6700 Ludwigshafen, Germany

[22] Filed: Jan. 13, 1972

[21] Appl. No.: 217,513

[52] U.S. Cl.................................................55/29, 55/72
[51] Int. Cl. ...........................................B01d 53/14
[58] Field of Search.........................55/29–31, 72; 423/99, 101, 109, 210

[56] References Cited
UNITED STATES PATENTS

| | | | |
|---|---|---|---|
| 3,512,220 | 5/1970 | Hynd et al. | 55/72 |
| 3,627,482 | 12/1971 | Olson et al. | 423/109 |
| 3,647,359 | 3/1972 | Bell | 423/99 |

*Primary Examiner*—Charles N. Hart
*Attorney*—Johnston, Root, O'Keefe, Keil, Thompson & Shurtleff

[57] ABSTRACT

Hydrogen produced in the electrolysis of alkali metal chlorides by the amalgam process is dried and demercurized by direct cooling with aqueous solutions of alkali metal hydroxides having a temperature of below 0°C.

2 Claims, 3 Drawing Figures

METHOD OF DRYING AND DEMERCURIZING HYDROGEN

In the electrolysis of alkali metal chlorides, chlorine, alkali metal hydroxide and water are produced in equivalent amounts. In the amalgam process the hydrogen is generated in the decomposer in which the alkali metal amalgam formed in the primary cell is catalytically decomposed with water at temperatures of about 60° to 120°C into mercury, alkali metal hydroxide and hydrogen. The hydrogen leaving the decomposer is saturated with water vapor and mercury vapor to an extent depending on the temperature of the caustic solution used in the decomposer. Following direct or indirect cooling with water, the moisture and mercury vapor contents of the hydrogen approximately correspond to the partial pressures of water and mercury at the hydrogen temperature achieved. At hydrogen temperatures of from +10° to +30°C, which may be achieved by indirect cooling with water at a temperature of from approx. +5° to +25°C, the moisture content of the hydrogen is about 10 to 30 g/m$^3$ of $H_2$ and the mercury content is approx. 5 to 30 mg/m$^3$ of $H_2$ (see FIG. 3).

Hydrogen produced in this manner is otherwise very pure, its purity being usually better than 99.9 percent. However, its high mercury content renders it useless for many applications, for example for the hydrogenation of fats for use in foodstuffs and for all hydrogenations in which the hydrogenation catalyst is poisoned by mercury. In some cases, the water content is also undesirable. For example, it causes trouble when the moist hydrogen is fed in winter to a consumer plant through uninsulated and unheated pipelines over longish distances, as the formation of ice in the pipes may cause blockage thereof.

Both the moisture and the mercury contents may be further reduced by subjecting the hydrogen to refrigeration below 0°C. It is known (see J. Billiter, "Die technische Elektrolyse der Nichtmetalle," 1954, p. 284) to effect refrigeration of hydrogen by forcing the gas (initially at about 30°C) trough cotton filters sandwiched between perforated plates in drums having a diameter of about 2 m. The gas is then cooled to −50°C by an ammonia refrigerating machine. To avoid blockage in the cooler due to the formation of ice, it is necessary, in this process, to remove the moisture from the hydrogen, for example by washing with sulfuric acid. However, this method of removing the mercury is complicated and expensive.

In principle, refrigeration below 0°C, should be possible, despite the moisture content of the hydrogen, by direct cooling of the hydrogen by washing with a suitable aqueous cooling brine. However, in such a method the concentration of the brine falls continuously due to the water removed from the hydrogen. The brine becomes unusable and must be reconcentrated either by the addition of fresh brine or by evaporation. The first alternative leads to an undesirable or unacceptable increase in the volume of brine used and the second alternative is uneconomical.

I have now found that the above drawbacks can be avoided in the refrigerative drying and demercurization of hydrogen which has been produced by the electrolysis of alkali metal chlorides by the amalgam process, if the said hydrogen is directly cooled with aqueous solutions of alkali metal hydroxides having a temperature below 0°C.

Figure 2:
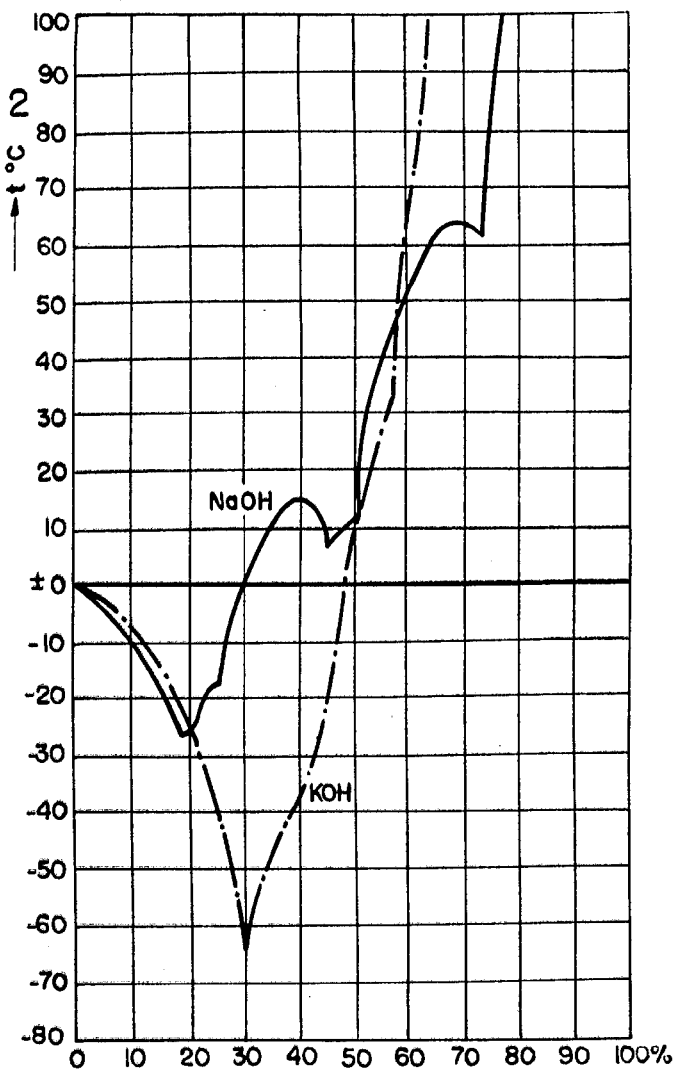
FIG. 2 shows the cooling temperature for the alkali metal chlorides.

As can be seen from FIG. 2, cooling temperatures of about −25°C may be reached when using sodium hydroxide solutions as coolant and of about −55°C when potassium hydroxide solution is used. The degree of drying and demercurization is adequate for most purposes when the caustic solution has a temperature of from −15° to −25°C. Depending on the temperature of the coolant used, the concentration of the caustic solution is chosen such that there is no risk of encrustation due to freezing of the solution. Thus the caustic solutions used have a concentration which is approximately 1 percent by weight below the concentration found in the right-hand branch of the freezing-point curve for the temperature used, whilst care is taken to ensure that the concentration does not fall below a level which is above approximately 1 percent by weight more then the corresponding value found in the left-hand branch of the freezing-point curve, this being achieved for example by adjusting the residence time of the coolant in the cooler according to the moisture content of the hydrogen.

Figure 3:
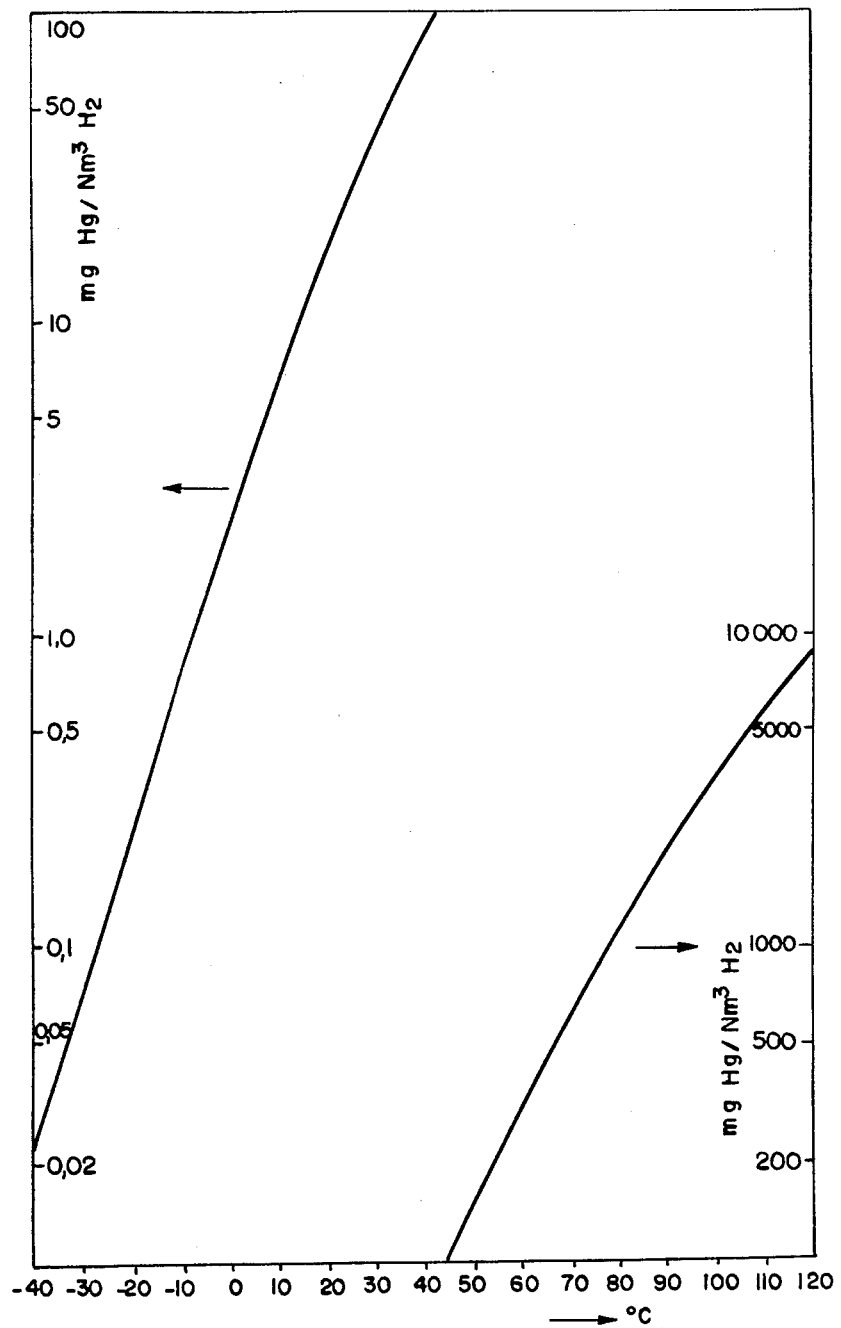
FIG. 3 shows content of Hg, $H_2O$ and $H_2$ under varying temperatures.

When cooling hydrogen by the method of the invention the moisture content of the gas is reduced to a level at which the dew point is some degrees lower than that corresponding to the cooling temperature used, this being due to the low partial pressure of the water vapor of the caustic solutions. The mercury content of the thus cooled hydrogen may be seen from FIG. 3. For example, when cooling is effected at −20°C, the mercury content is 0.25 mg/m$^3$ of $H_2$. This means that when the hydrogen leaving the electrolytic cell is precooled to 30°C, a temperature normally reached in the summer months when the temperature of the cooling water is least favorable, and the corresponding mercury content of the hydrogen is 33 mg/m$^3$, the recovery of mercury is more than 90 percent.

Figure 1:
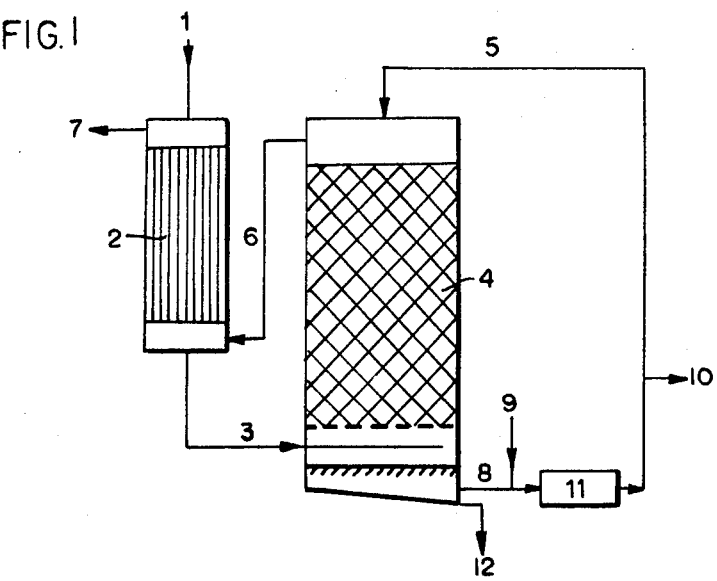
FIG. 1 is a flow diagram of an apparatus for carrying out the method.

The method of the invention is briefly described below with reference to FIG. 1.

Hydrogen leaving the decomposers of a plant for the electrolysis of alkali metal chlorides is precooled directly or indirectly with cooling water and passes to the heat exchanger 2 through pipe 1. It then passes through line 3 to the insulated packed washing tower 4 in which it is washed with intensely cooled caustic solution. The major portion of the water and mercury is thus removed from the hydrogen. The hydrogen then passes through line 6 to the heat exchanger 2 where it serves to precool the hydrogen coming from the electrolytic plant. The purified hydrogen is removed via line 7.

The intensely cooled alkali metal hydroxide solution is fed to the top of the washing tower 4 through line 5. It leaves the tower through pipe 8 and is recooled in the evaporator of the refrigerating unit 11. Since the caustic solution is increasingly diluted by the water removed from the hydrogen and would eventually crystallize out (see FIG. 2), such an amount of fresh concentrated solution is added through line 9 that the concentration of the circulated solution is maintained at a level which avoids all risk of the solution freezing. The excess dilute solution is removed from the circulation system through line 10 and the separated mercury is discharged through line 12.

The great advantage of the method of the invention comprising the direct cooling of hydrogen with alkali metal hydroxide solutions as cooling medium for the purpose of drying and demercurizing the hydrogen is readily apparent. Caustic soda solution and caustic potash solution are not corrosive at low temperatures. Thus the apparatus can be of iron and has a virtually unlimited life. The difficulties involved in the use of other cooling brines, as described above, do not occur when alkali metal hydroxide solutions are used as coolant. Sufficient quantities of concentrated caustic solutions are available in every plant for carrying out the electrolysis of alkali metal chlorides. The dilute caustic solutions removed from the cooling circulation system have a number of direct applications, for example in brine preparation, in the manufacture of bleaching solutions or for use in plants for the destruction of chlorine, etc. If desired or if necessary, these solutions may be concentrated without energy consumption by feeding them either to the water which is fed to the decomposers or by introducing them into the decomposers of individual cells direct. The amount of dilute caustic solution produced being relatively small, it is possible to add said dilute solutions to the working caustic solution without appreciably altering its concentration if the concentration of the said working caustic solution in the decomposers is increased slightly.

I claim:

1. A refrigerative method of drying and demercurizing hydrogen obtained from the electrolysis of alkali metal chlorides by the amalgam process, wherein the hydrogen is directly cooled with aqueous solutions of alkali metal hydroxides having temperatures below 0°C.

2. A method as claimed in claim 1, wherein the caustic solutions used are caustic soda or caustic potash.

* * * * *